United States Patent [19]

Ibamoto et al.

[11] Patent Number: 4,672,197
[45] Date of Patent: Jun. 9, 1987

[54] PHOTOSENSOR EMPLOYING OPTICAL GUIDE POSTS TO DETECT AN OBJECT IN THE PATH

[75] Inventors: Masahiko Ibamoto, Katsuta; Takamasa Hori, Toukai; Hideki Asano, Mito; Hajime Yokota, Katsuta, all of Japan

[73] Assignee: Hitachi, Ltd., Tokyo, Japan

[21] Appl. No.: 806,806

[22] Filed: Dec. 10, 1985

[30] Foreign Application Priority Data

Dec. 12, 1984 [JP] Japan .................... 59-260757

[51] Int. Cl.⁴ .............................................. H01J 5/16
[52] U.S. Cl. ..................................... 250/227; 250/548
[58] Field of Search ............... 250/227, 548, 560, 570; 350/96.1; 353/26 A

[56] References Cited

U.S. PATENT DOCUMENTS 4,333,009  6/1982  Stevens ............................ 250/227
4,343,991  8/1982  Fujiwara et al. ................. 250/548

Primary Examiner—Edward P. Westin
Assistant Examiner—S. Allen
Attorney, Agent, or Firm—Antonelli, Terry & Wands

[57] ABSTRACT

A plurality of optical guide paths are built in a guide path plate. A plurality of optical guide posts are erected on the guide path plate so that each may oppose to one end of the corresponding optical guide path. The other end of at least one of the optical guide paths is optically connected to a light projecting portion, and the other end of at least another of the optical guide paths is optically connected to a light receiving portion. A part to-be-sensed which is movable is located between the distal ends of the optical guide posts whose base ends are connected to the corresponding optical guide paths. The presence of the part to-be-sensed is detected in such a way that the part to-be-sensed interrupts or transmits light which passes between the distal ends of the optical guide posts.

7 Claims, 9 Drawing Figures

PHOTOSENSOR EMPLOYING OPTICAL GUIDE POSTS TO DETECT AN OBJECT IN THE PATH

FIELD OF THE INVENTION

The present invention relates to improvements in a photosensor, and more particularly to a photosensor which is well-suited for provision in the mechanical portions of information equipment etc.

BACKGROUND OF THE INVENTION

The tape driver of a conventional device, for example, a video tape recorder (VTR) is formed in several places with photointerrupters which are composed of light emitting diodes LED and photodiodes PD, and which serve for the acknowledgement of the insertion of a cassette, the detection of the loosening of a tape, etc. They require electric wiring and are often mounted in places distant from a printed circuit board, so that wiring leads must be laid on a chassis. The job of laying the wiring leads is difficult of automation. Moreover, components which detest electric noise, such as magnetic heads, are mounted on the chassis, and it must be avoided to the utmost to lay the wiring leads for the sensors near the components.

It is therefore considered to employ a photosensor, for example, a photosensor which is disclosed in the official gazette of Japanese patent application Laid-open No. 57-796 issued on Jan. 5, 1982. In the sensor described in the above official gazette, however, the section between a light source and a part to-be-sensed and the section between the part to-be-sensed and a light receiving portion are independent as optical fiber paths or optical guide paths which are separate from each other. Besides, optical fiber guide paths and optical delay lines are included in correspondence with a plurality of parts to-be-sensed, and complicated wiring is inevitably involved according to the arrangement of the plurality of parts to-be-sensed.

SUMMARY OF THE INVENTION

An object of the present invention is to provide a photosensor which dispenses with the job of laying wiring leads, to facilitate the automation of assemblage and which can eliminate the influence of electric noise.

To this end, in the present invention, light is guided from a light projecting portion and a light receiving portion to required places on a guide path plate by means of a plurality of optical guide paths built in the guide path plate, whereupon a part to-be-sensed is constructed outside the guide path plate owing to optical guide posts.

DETAILED DESCRIPTION OF THE PREFERRED EMBODIMENTS

Figure 1:
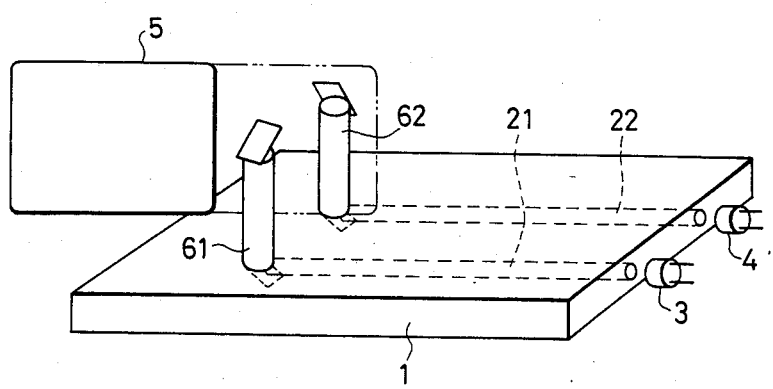
FIG. 1 is a perspective view showing the fundamental setup of a photosensor according to the present invention.

Referring to FIG. 1, numeral 1 designates a well-known optical guide path plate. Although various guide path plates made of glass, semiconductor, etc. are applicable, a plastics guide path plate is suitable in practical use. By way of example, a method of manufacture is known in which a semi-gelled film containing a highly refractive monomer is irradiated with ultraviolet radiation by the use of a photomask so that only guide path portions may be exposed to the radiation, whereupon highly refractive ions in the unreacted part of the film not irradiated are exchanged for low refractive ions. Each of the guide paths 21 and 22 thus formed has one end thereof exposed to an end part of the guide path plate 1 so as to confront a light emitting diode (LED) 3 as a light projecting portion or a photodiode 4 for a light receiving portion. The other ends of the respective guide paths 21 and 22 are led to positions directly below a part to-be-sensed.

Here, the part to-be-sensed is a part for acknowledging the loading of a cassette in, e.g., a VTR, the part being detected when a light beam is interrupted by a light interrupting piece 5 with which a cassette holder is provided, or a part for detecting the loosening and coming-off of a tape, the part being detected when a light beam having been interrupted by the tape till then becomes continuous. In some cases, a method in which the light projecting portion and the light receiving portion are coupled through reflection may be adopted. It is accordingly important to pass the detecting light beam through a space which is distant from the guide path plate 1. To this end, optical guide posts 61 and 62 are disposed in the setup of FIG. 1. Light is derived vertically from the guide path 21 in the guide path plate 1 and is propagated through the space as the detecting light beam by means of the optical guide post 61. Thereafter, the light is brought back into the guide path 22 again by means of the optical guide post 62.

Figure 2:
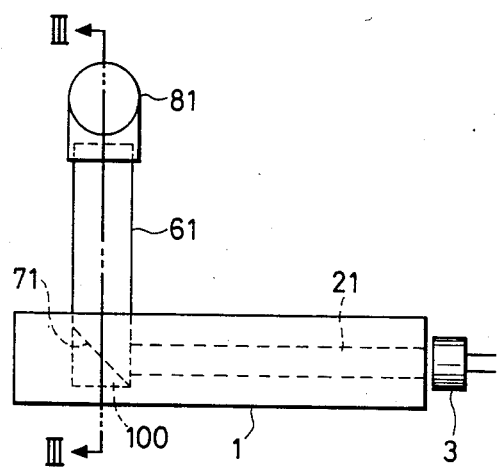
FIG. 2 is a side view of a first embodiment of optical guide posts depicted in FIG. 1.
Figure 3:
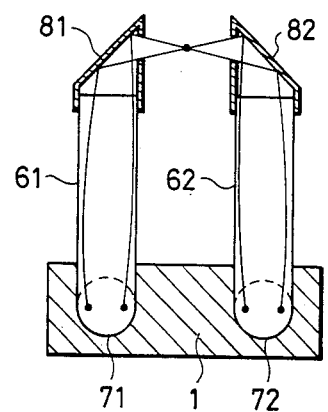
FIG. 3 is a sectional view taken along line III—III in FIG. 2.

Referring to FIGS. 2 and 3, the optical guide posts 61 and 62 are made of plastics rod lenses by way of example, but they may of course be made of glass rod lenses. The rods whose bottom surfaces are cut obliquely at 45° and polished are used, and if necessary, the bottom surfaces are formed with reflectors 71 and 72 by aluminum plating or the like. This is based on the fact that, since the refractive index of the body of the guide path plate 1 is usually on the order of 1.4–1.5, it is not considerably different from the refractive index of the optical guide posts 61 and 62 buried in the plate body, so the total reflection cannot be utilized. In this regard, when cavities 100 are formed around the bottoms of the optical guide posts 61 and 62 by way of example, the index difference between the optical guide posts and the cavities becomes great because the refractive index of the air in the cavities 100 is 1.00. In consequence, the light from the optical guide path can be led to the optical guide post without forming the reflector.

The head parts of the optical guide posts 61 and 62 are furnished with reflectors 81 and 82 respectively. These are tubular slant inner-surface mirrors made of metal or plastics, which are respectively fixed to the optical guide posts 61 and 62 after adjusting optic axes and foci.

The light emitted from the light projecting portion 3 passes through the guide path 21, enters the rod lens of the optical guide post 61 from the side surface thereof and is deflected upwards by the reflector 71. Since the length of the rod lens is shorter than ½ pitch of the meandering cycle of the light beam in the rod lens, the light beam emerges from the upper part of the rod lens while being converged by a condensing action. When the light beam is reflected by the reflector 81, it is focused in the space between the optical guide posts 61 and 62, and it advances to the reflector 82 while spreading itself again. In the optical guide post 62, the light propagates in quite the reverse sequence, and it passes through the guide path 22 till reaching the photodiode (light receiving portion) 4.

In such a setup, the light is focused near a detection point which lies between the optical guide posts 61 and 62, and hence, very abrupt detection can be done for the portion of the light interrupting plate 5.

With the optical guide posts 61 and 62 in FIGS. 2 and 3, the light is put in and out from the side surfaces of the bottom parts of the rod lenses, so that optical lengths at the center axes and peripheries of the rod lenses differ to give rise to some aberration in the focus. However, they are satisfactory in practical use. In order to form a preciser focus, also the bottom portion of each optical guide post may be put into the same structure as that of the head portion in such a way that both the ends of the rod lens are cut at right angles to the optic axis and are respectively furnished with reflectors.

Figure 4:
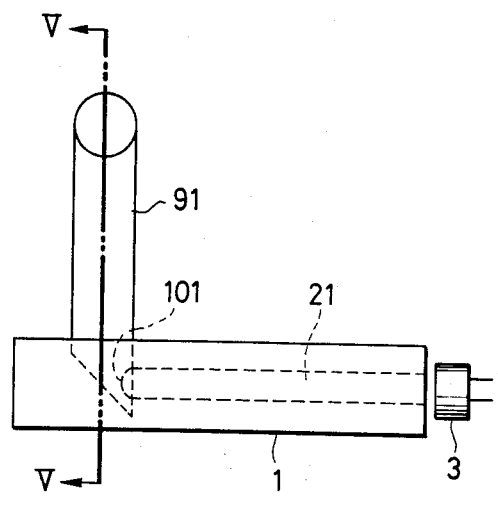
FIG. 4 is a side view of a second embodiment of the optical guide posts depicted in FIG. 1.
Figure 5:
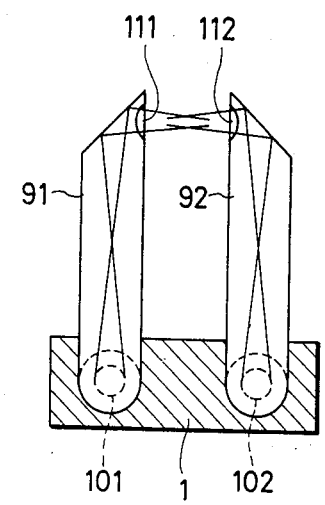
FIG. 5 is a sectional view taken along line V—V in FIG. 4.

An embodiment of FIGS. 4 and 5 differs from that of FIGS. 2 and 3 in that the structure of the optical guide posts are simplified more. Each of optical guide posts 91 and 92 is such that the bottom part and head part of a round bar made of a transparent material, for example, acrylic fiber or glass are cut obliquely. Further, if necessary, it is entirely coated with a reflective film by such a method as aluminum plating. The optical guide posts 91 and 92 are respectively provided with windows 101 and 111 and windows 112 and 102 at their entrance and exit ports.

Light from a guide path 21 enters the optical guide post 91 from the window 101. Herein, since the end face of the guide path 21 is a flat surface and the window 101 is a cylindrical surface, the light undergoes a condensing action in the horizontal direction and becomes a flat beam in the vertical direction. The light beam is reflected by the slant bottom surface, and advances upwards. Since, however, the optical guide post 91 is not a rod lens, it has no condensing action, and the light beam is propagated up to the head part by reflections on the wall surface of the post. Since the head part is slant likewise to the bottom surface, the light beam changes its optic axis into the horixontal direction. If, at this time, the light beam is reflected in a direction orthogonal to the optic axis of incidence from the guide path 21 to the optical guide post 91, it becomes a beam flat in the horizontal direction and advances to the window 111. Since the window 111 is also in the shape of a cylindrical surface, it condenses the light in the horizontal direction similarly to a cylindrical lens, and the light beam is fined and emerges. Accordingly, abrupt detection can be done for the movement of a light interrupting plate. In the optical guide post 92, the light is similarly propagated along quite the reverse course until it is led to a guide path 22.

With such a setup, the optical guide posts can be produced in large quantities and at low cost by simple extrusion molding.

When convex lenses are formed at the parts of the window 101, 102, 111 and 112 at the time of the extrusion molding, the condensing performance can be more enhanced.

Figure 6:
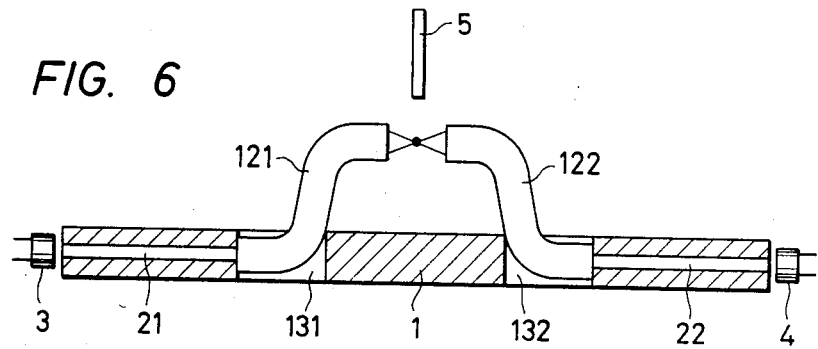
FIG. 6 is a side view of a third embodiment of the optical guide posts depicted in FIG. 1.

Referring to FIG. 6, optical guide paths 21 and 22 are provided in a guide path plate 1, and slots 131 and 132 are provided at the rear ends thereof. Rod lenses 121 and 122 curved in the shape of letter S are confronted and fixed in the slots as shown in the figure. In this case, the length of the rod lenses is determined beforehand so that a focus may be owned in common in a space in which both the rod lenses oppose. Thus, the light of a light projecting portion (LED) 3 passes through the guide path 21 to enter the rod lens 121, it advances within the curved rod lens while converging, and it forms the focus in a part to-be-sensed and thereafter enters the rod lens 122. The light enters the guide path 22 along quite the reverse course until it reaches a light receiving portion (photodiode) 4. According to this system, the light can be guided in the air without providing any reflectors, and the photosensor can be constructed with a simpler structure.

Figure 7:
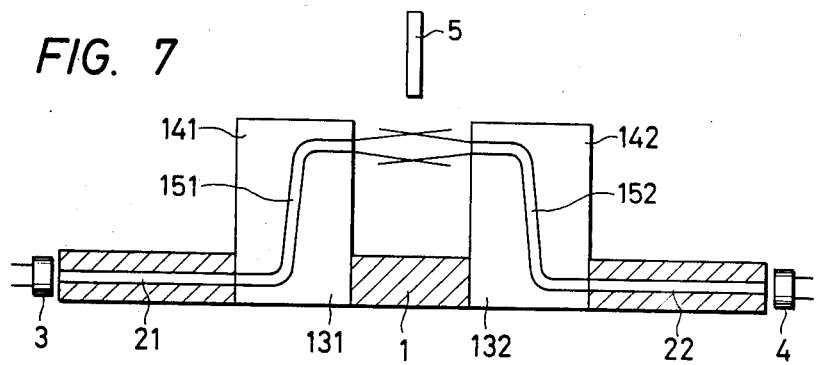
FIG. 7 is a side view of a fourth embodiment of the optical guide posts depicted in FIG. 1.

Referring to FIG. 7, a difference from FIG. 6 is that the rod lenses 121 and 122 are replaced with second guide path plates 141 and 142. This dispenses with curving the rod lenses, and the second guide wave plates 141 and 142 may be inserted into the respective slots 131 and 132 of the optical guide path plate 1, so that the fabrication and the structure become simpler. Numerals 151 and 152 designate optical guide paths.

Figure 8:
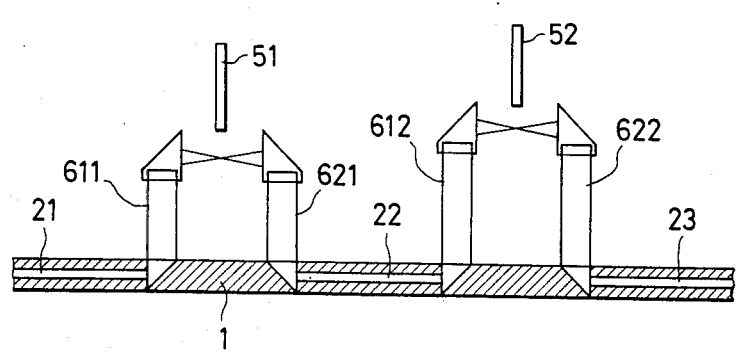
FIG. 8 is a side view of an embodiment which takes the logic of parts to-be-sensed.

In an embodiment of FIG. 8, at least two sets of optical guide posts 611, 621 and 612, 622 are disposed in correspondence with two light interrupting plates 51 and 52 respectively, and they are connected in cascade. When either light interrupting piece 51 or 52 interrupts a light beam, it fails to be received. According to this method, the number of places to-be-detected can be increased without especially disposing light projecting portions and light receiving portions anew, to bring forth the effect that a device of higher reliability can be fabricated without appreciable rise in cost. In FIG. 8, the optical guide posts are employed because the rod lens system shown in FIGS. 2 and 3 is selected as an expedient of low light loss during the propagation of light in a space. By way of example, when the whole optical length is shortened and a light source of high power is used, the optical guide posts 91 and 92 shown in FIGS. 4 and 5 may well be employed. Moreover, the optical guide posts 611 and 621 and those 612 and 622 shown in FIG. 8 may well be coupled by the reflection method. In that case, no light is received when the reflection of either coupled part fails.

The photocoupled sets can be used as AND, OR, NAND, inhibit, exclusive OR, etc. of logic elements in accordance with the combinations thereof.

Figure 9:
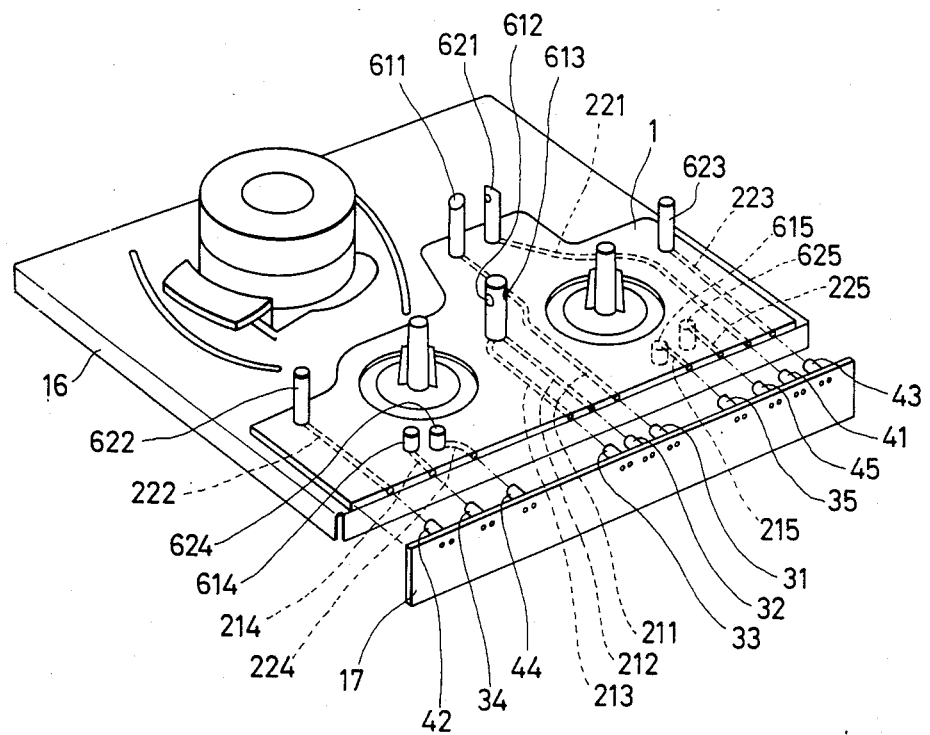
FIG. 9 is a perspective view showing an embodiment in which the present invention is applied to a VTR.

FIG. 9 is a perspective view of a photosensor which is applied to a video tape recorder as one embodiment of the present invention.

A guide path plate 1 is stuck on a chassis 16, and optical guide posts 611–615 and 621–625 are erected on required places thereof. When the optical guide posts 615 and 625 are erected downwards at need, detection on the rear side of the chassis 16 is also possible. Optical guide paths 211-215 and 221-225 have their respective outer ends exposed to a side face of the guide path plate 1, and light emitting diodes LED (light projecting portions) 31-35 and photodiodes PD (light receiving portions) 41-45 are mounted on a printed circuit board 17 so as to oppose to the exposed ends of the optical guide paths and are optically connected therewith directly or by optical fibers.

The printed circuit board 17 may be either a dedicated one for the photosensor, or one used in common, for example, a part of a printed circuit board for a front panel.

According to such construction as regards the photosensor, a mechanical portion requires no electric or optical fiber wiring, to produce the effect that the operations of laying wiring leads can be sharply reduced, and electric wiring near a magnetic heat etc. can be reduced, to produce the effect that the influence of noise can be lessened. Moreover, photosensors can be introduced anew even into places where the operations of laying wiring leads have heretofore been bottlenecks, so that the functions and reliability of the whole device can be enhanced more.

According to the present invention, a photosensor can be disposed without laying wiring leads near a part to-be-sensed, which brings forth, not only the effect that the automation of an assembling job is facilitated to enhance productivity, but also the effect that the problem of electric noise can be relieved.

What we claim is:

1. A photosensor wherein a light projecting portion and a light receiving portion are optically connected thereby to sense the presence of a part to-be-sensed; characterized by comprising a guide path plate in which a plurality of optical guide paths are built, a plurality of optical guide posts which are so erected on said guide path plate that one end of said each post joins to the corresponding optical guide path and that the other ends of said posts couple to each other through the part to-be-sensed, a light projecting portion which is optically connected to one end of at least one of said optical guide paths, and a light receiving portion which is optically connected to one end of at least another of said optical guide paths.

2. A photosensor according to claim 1, wherein said optical guide post is a rod lens at least one end of which is provided with a reflector.

3. A photosensor according to claim 1, wherein said optical guide post is a transparent body both ends of which are cut obliquely.

4. A photosensor according to claim 1, wherein said optical guide post is made of a transparent body both ends of which are cut obliquely at 45° and which is so sensed that an optic axis of entrance and an optic axis of exit intersect orthogonally to each other.

5. A photosensor according to claim 1, wherein said optical guide post is formed with condensing lenses at entrance and exit ports by extrusion molding.

6. A photosensor according to claim 1, wherein said optical guide post is made of a rod lens which is curved and formed so as to lead light from said optical guide path to the exterior of said guide path plate.

7. A photosensor according to claim 1, wherein said optical guide post is made of a second guide path plate which derives light in said optical guide path to the exterior of said guide path plate.

* * * * *